United States Patent
Nakagawa et al.

(10) Patent No.: US 6,458,903 B1
(45) Date of Patent: Oct. 1, 2002

(54) POLYMERIZATION METHOD

(75) Inventors: Yoshiki Nakagawa, Kobe (JP); Shigeki Ono, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/701,701

(22) PCT Filed: Jun. 1, 1999

(86) PCT No.: PCT/JP99/02926

§ 371 (c)(1),
(2), (4) Date: Feb. 21, 2001

(87) PCT Pub. No.: WO99/62959

PCT Pub. Date: Dec. 9, 1999

(30) Foreign Application Priority Data

Jun. 1, 1998 (JP) .......................................... 10-151572
Jun. 1, 1998 (JP) .......................................... 10-151573
Jun. 19, 1998 (JP) .......................................... 10-172957

(51) Int. Cl.$^7$ ................................ C08F 2/00; C08F 4/80
(52) U.S. Cl. ........................ 526/147; 526/86; 526/90; 526/135; 526/171; 526/204; 526/217; 526/220; 526/317.1; 526/319; 526/346
(58) Field of Search ................................ 526/90, 147, 86, 526/135, 171, 204, 217, 220, 317.1, 319, 346

(56) References Cited

U.S. PATENT DOCUMENTS 5,763,548 A   6/1998   Matyjaszewski et al.
5,789,487 A   8/1998   Matyjaszewski et al.
5,807,937 A   9/1998   Matyjaszewski et al.

FOREIGN PATENT DOCUMENTS

EP   0 789 036 A2   8/1997
EP   0 816 385 A1   1/1998
WO   WO 96/30421    10/1996
WO   WO 97/18247    5/1997
WO   WO 98/01480    1/1998
WO   WO 98/40415    9/1998

OTHER PUBLICATIONS

Matyjaszewski et al, Synthesis of Well–Defined Polyacrylonitrile by Atom Transfer Radical Polymerization, Macromolecules, vol. 30, No. 20, 6398–6400, 1997.*

* cited by examiner

Primary Examiner—Fred Teskin
(74) Attorney, Agent, or Firm—Connolly Bove Lodge & Hutz LLP

(57) ABSTRACT

This invention is related to a polymerization method
wherein an atom transfer radical polymerization of a vinyl monomer is carried out under at least one condition selected from the group consisting of the following (1), (2), (3) and (4):
(1) in a substantially anhydrous system;
(2) in the presence of a nitrile compound;
(3) addition, to the system, of a ligand to the polymerization catalyst to thereby initiate the polymerization;
(4) varying a polymerization catalyst activity during polymerization to thereby control the rate of polymerization.

This invention provides a method which allows the terminal halogen atom to remain at a high rate in atom transfer radical polymerization, solve such problems as the difficulty in polymerization rate control as caused by catalyst precipitation and wide variation in catalyst amount, provide a simple and safe method of polymerization initiation as well as a method of controlling the rate of polymerization, and indicate a method of improving the polymerization procedure.

25 Claims, 3 Drawing Sheets

POLYMERIZATION METHOD

TECHNICAL FIELD

The present invention relates to a method of controlling atom transfer radical polymerizations.

BACKGROUND ART

Various living polymerization techniques have so far been developed and it has become possible to produce polymers controlled in molecular weight, molecular weight distribution and terminal structure. As examples, there may be mentioned the anionic coordination polymerization of polypropylene glycol and the living cationic polymerization using an iniferter and a Lewis acid catalyst. In addition, in recent years, the technique of living radical polymerization has been developed, which makes it possible to control the radical polymerization, which has so far been regarded as very difficult to control.

Living radical polymerization is a radical polymerization in which the activity of the polymerization terminus is not lost but is maintained. While, in its narrow sense, the term "living polymerization" means the polymerization which proceeds while the terminal activity is maintained, it generally includes the so-called pseudo-living polymerization in which terminally inactivated species and terminally active species are in equilibrium. It is the latter definition that applies in the present invention. In recent years, living polymerization has been energetically studied by a number of groups. As examples, there may be mentioned a technique using such a radical scavenger as a cobalt-porphyrin complex (J. Am. Chem. Soc., 1994, 116, 7943) or a nitroxide compound (Macromolecules, 1994, 27, 7228) and the atom transfer radical polymerization (ATRP) technique using an organic halide as an initiator and a transition metal complex as a catalyst, among others. Atom transfer radical polymerization is generally carried out using an organic halide or sulfonyl halide compound as an initiator and, as a catalyst, a metal complex containing a central metal atom selected from among elements of the groups 7, 8, 9, 10 and 11 of the Periodic Table (see e.g. Matyjaszewski et al., J. Am. Chem. Soc., 1995, 117, 5614; Macromolecules, 1995, 28, 7901; Science, 1996, 272, 866; or Sawamoto et al., Macromolecules, 1995, 28, 1721). According to these techniques, the rate of polymerization is generally very high, and, in spite of the fact that they involve radical polymerization in which such a termination reaction as coupling of radicals readily occurs, the polymerization proceeds in a living manner to give a polymer with a narrow molecular weight distribution (Mw/Mn=1.1 to 1.5), and the molecular weight can be arbitrarily controlled by selecting the monomer/initiator charge ratio. In the present specification, the term "molecular weight distribution" means the weight average molecular weight/number average molecular weight ratio as determined by gel permeation chromatography.

As the term "atom transfer radical polymerization" indicates, an initiator-derived halogen atom generally occurs at the growing polymer terminus. In actuality, however, it is a problem that such atom may disappear owing to various side reactions.

Of the catalysts useful in atom transfer radical polymerization, some are completely soluble in the polymerization system and give homogeneous systems but most of them are not completely soluble, hence are used in heterogeneous systems. For example, when 2,2'-bipyridyl, one of the ligands in most frequent use, is used in the polymerization using CuCl or CuBr, the polymerization systems generally become heterogeneous. As a measure for obtaining a homogeneous system, there is a technique involving substitution of an alkyl group on the pyridine rings of bipyridyl and it is reported that substitution of 1-butylpentyl or the like results in formation of a homogeneous system. Further, it is reported that the use of a highly polar solvent such as ethylene carbonate results in an increased solubility of the complex to give a system more close to a homogeneous one (Macromolecules, 1998, 31, 1535). However, it is also mentioned that, even in that case, a reduction in solvent amount leads to a decreased solubility and a reduced rate, for instance.

It has recently been reported that aliphatic polyamines (e.g. pentamethyldiethylenetriamine), which are inexpensive and commercially available, are also effective ligands and can be used in lieu of bipyridyl ligands and the like. However, even the use of such ligands cannot render the polymerization system completely homogeneous.

If the polymerization system is heterogeneous, the catalyst may precipitate and/or stick to the vessel wall, so that it is not easy to stabilize the rate of polymerization and it is difficult to control the rate of polymerization because of the changing catalyst concentration.

On the other hand, the use of acetonitrile as a solvent is mentioned as an example in a patent specification (WO 97/18247), without mentioning any particular effect thereof. There is no description of the appropriateness of this for use in combination with aliphatic polyamine ligands. Furthermore, the relevant descriptions made therein are all concerned with the use thereof as a solvent. There is no description at all of the addition of acetonitrile or a nitrile compound in small amounts as an additive.

The initiation of atom transfer radical polymerization is generally effected by preparing a monomer/catalyst/solvent mixture and finally adding an initiator. When a liquid initiator is used, it can be added with ease using a syringe or the like. When it is a solid, it also can be added in the form of a solution in a solvent. Upon addition of the initiator, the polymerization begins to proceed immediately. Therefore, for obtaining a polymer with a narrow molecular weight distribution, it is necessary to add the initiator all at once. However, if the initiator is added all at once and the polymerization begins to take place immediately, a considerable heat liberation will be encountered. In large-scale production, this heat liberation is very dangerous. For avoiding this problem, a method is conceivable which would comprise adding the catalyst last after preparing a monomer/initiator/solvent mixture. In this case, catalyst addition can be made while watching the state of polymerization initiation, whereby the danger in question may be avoided. As far as the catalyst is concerned, unlike the case of the initiator mentioned above, adding the same over a certain time period theoretically does not give a remarkable influence on the molecular weight distribution and the like. However, the technique of atom transfer radical polymerization most often uses a metal complex, which is a solid, as the catalyst. Moreover, many a catalyst gives a heterogeneous polymerization system as mentioned above, and it is not easy to dissolve it in a solvent. It is, therefore, not easy to initiate the polymerization by addition of catalyst. In fact, no report has been made so far concerning such a process involving the addition of a catalyst in this manner.

In living polymerization, a growing terminus retains the polymerizing activity from the initial to terminal stage of polymerization and, as a result, the rate of polymerization shows an approximately linear relation with the monomer concentration. When living polymerization is carried out batchwise by charging the reaction apparatus with the whole amount of the monomer to be used in polymerization from the beginning, the amount of the monomer polymerized per unit time is greatest at the early stage and then gradually decreases as the monomer is consumed. Similar problems are encountered even in semi-batchwise polymerization, which is conducted by supplementing the monomer batchwose or continuously after initiation to avoid the risk of uncontrolled progress of polymerization, which is a matter of particular concern in radical polymerization. In this case, even if the amount of the monomer remaining in the polymerization system is maintained at a constant amount, the growing terminus concentration and catalyst concentration are highest at the early stage and then diluted with the accumulation of the polymer formed. As a result, like in the case of batchwise polymerization, the amount of the monomer polymerized per unit time is the greatest in the early stage and then decreases gradually. This amount of monomer polymerized per unit time determines the amount of heat liberated and, therefore, how to control and stabilize this heat liberation is very important in industrial polymerization processes. However, in such living polymerization as mentioned above, for the reasons mentioned above, it is usual that an intense heat liberation takes place in the early stage. This is an obstacle to scale enlargement and product structure control. If the catalyst activity is reduced to suppress this heat liberation, an undesirably long total polymerization time may be required. While the productivity is a very important factor in industrial scale production, a dilemma is encountered that enhancing the catalyst activity for curtailment of the total polymerization time results in excessive heat liberation in the early stage.

Accordingly, it is the object of the present invention to allow the terminal halogen atom to remain at a high rate in atom transfer radical polymerization, solve such problems as the difficulty in polymerization rate control as caused by catalyst precipitation and wide variation in catalyst amount, provide a simple and safe method of polymerization initiation as well as a method of controlling the rate of polymerization, and indicate a method of improving the polymerization procedure.

DISCLOSURE OF THE INVENTION

The present invention relates to a polymerization method wherein the atom transfer radical polymerization of a vinyl monomer is carried out under at least one condition selected from the group consisting of the following (1), (2), (3) and (4):

(1) in a substantially dehydrated system;
(2) in the presence of a nitrile compound;
(3) addition, to the system, of a ligand to the polymerization catalyst to thereby initiate the polymerization;
(4) varying a polymerization catalyst activity during polymerization to thereby control the rate of polymerization.

Atom transfer radical polymerization comprises equilibrium reactions involving the initiator, growing terminus and the transition metal complex catalyst but, basically, it is a radical polymerization involving formation of a radical at a growing terminus and monomer polymerization by means of the radical. Generally, as can be seen from the fact that emulsion polymerization and dispersion polymerization, for instance, are conducted in water in industrial productions, radical polymerization is not affected by water. In atom transfer radical polymerization as well, it is shown in the literature, including patent specifications, that emulsion polymerization and dispersion polymerization are possible. Further, there are descriptions to the effect that addition of water does not produce any problem but no report says that addition of water must be avoided. Judgment about the success or failure in polymerization control is generally made on the basis of the number average molecular weight and molecular weight distribution while almost no discussion is found about the residual terminal group percentage because of difficulty in determining the same, among others. Atom transfer radical polymerization can be carried out in the manner of bulk polymerization as well, and an example of the use of a distilled monomer is also disclosed in the literature, without any mention about the total water content on the overall basis including the catalyst and initiator or about the residual terminal group percentage, however, to say nothing of the case in which a solvent is used.

As a result of their intensive investigations, the present inventors found that the water content in the polymerization system is closely related with the disappearance of the terminal halogen atom and that polymers retaining the terminal halogen atom at a high percentage can be obtained by eliminating the water. Further, this technique is useful in those cases that a polar compound having relatively high hydrophilicity, such as a nitrile compound and/or a catalyst ligand, is used in accordance with the present invention.

As a result of their intensive investigations, the inventors further found that addition of a nitrile compound is effective in improving the diffusibility of the catalyst owing to its potential for coordination with a transition metal compound. For still more increasing this effect, the catalyst precursor transition metal compound such as CuBr is preferably admixed with a nitrile compound prior to addition of a ligand such as an amine.

The above effect obtained according to the present invention differs from the effect resulting from mere use of a polar solvent. When a catalyst, which renders the polymerization system heterogeneous, is used, the use of apolar solvent generally improves the solubility of the catalyst but the use of the solvent in a reduced amount brings about such results as a decreased polarity of the system as a whole, a reduced solubility of the catalyst and a reduced rate of reaction (Macromolecules, 1998, 31, 1535). On the contrary, the addition of a nitrile compound according to the present invention is effective even at a low addition amount. It does not merely improve the solubility of the catalyst but prevents the adhesion to the vessel wall and/or precipitation of the catalyst, which makes the system heterogeneous, to thereby contribute to achieve uniform catalyst diffusion under stirring. This technology is effective also in increasing the diffusibility of the metal complex or salt prior to ligand addition in the polymerization initiation by catalyst ligand addition which is to be mentioned next herein.

Furthermore, as a result of their intensive investigations, the inventors found out a method of initiating the atom transfer radical polymerization by addition of a ligand therefor. Thus, a ligand-free metal salt, such as CuBr, alone is added to the polymerization system and then a catalyst ligand is added, whereupon a complex is formed in the system and it exhibits catalyst activity to initiate the polymerization. Many of the catalysts for atom transfer radical polymerization give heterogeneous polymerization systems, as mentioned above, and it is not easy to add them as they are or in the form dissolved in a solvent to the system. On the contrary, many of the ligands themselves occur as liquids or are readily soluble in a solvent, hence their addition is easy. The metal complexes (salts) prior to ligand addition are in many cases poorer in solubility and diffusability than the metal complexes to serve as catalysts. Once such a metal complex (salt) has adhered to the vessel wall before ligand addition, ligand addition may not be accompanied by immediate complex formation in some instances. For preventing this, the above-mentioned addition of a nitrile compound is effective.

In addition, as a result of their investigations, the inventors found that the polymerization can be controlled by controlling the rate of polymerization by causing the catalyst activity to vary during polymerization. As the method of causing the catalyst activity to vary, there may be mentioned the method comprising adding the catalyst and the method comprising supplementing the transition metal complex (catalyst)-forming ligand, as for the above-mentioned initiation reaction. The transition metal complex to serve as a catalyst in the practice of the present invention is preferably a copper complex and, as for the solvent or additive, one capable of forming a complex with the transition metal but having no catalyst activity is preferably added.

The above-mentioned four conditions (1) to (4) as found out by the present invention are each independently effective in controlling atom transfer radical polymerization but, when combined, can lead to more pronounced effects.

BEST MODES FOR CARRYING OUT THE INVENTION

Figure 1:
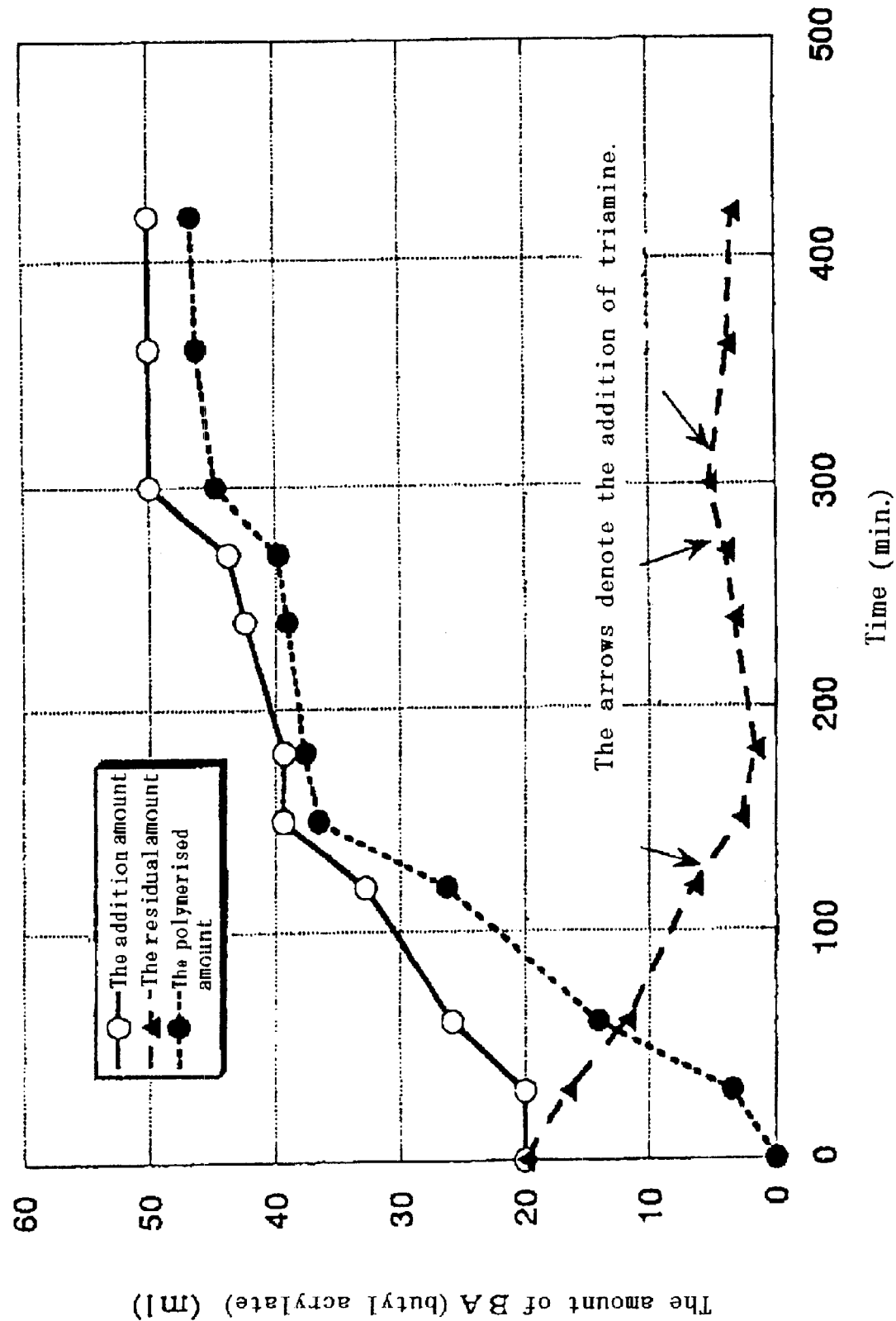
FIG. 1 is a graphic representation of the monomer addition amount, residual percentage and consumption versus time in Example 7.

In the following the present invention is described in detail.

<Outline of Atom Transfer Radical Polymerization>

"Living radical polymerization" is a radical polymerization in which the rate of polymerization is high and which is difficult to control due to a tendency toward occurrence of such a termination reaction as coupling of radicals. In spite of this, living radical polymerization hardly undergoes such a termination reaction and gives a polymer with a narrow molecular weight distribution (Mw/Mn=about 1.1 to 1.5), and the molecular weight can be arbitrarily controlled by selecting the monomer/initiator charge ratio.

Thus, "living radical polymerization" not only can give a polymer with a narrow molecular weight distribution and a low viscosity but also allows introduction of a monomer having a specific functional group at a practically arbitrary position of the polymer, hence it is more preferred as a method of producing vinyl polymers having such a specific functional group.

Among "living radical polymerization techniques", the technique of "atom transfer radical polymerization" by which vinyl monomers are polymerized using an organic halide or sulfonyl halide compound as an initiator and a transition metal complex as a catalyst is more preferred as a method of producing vinyl polymers having a specific functional group, since, in addition to the features of the above-mentioned "living radical polymerization", it gives polymers having, at a terminus, in a halogen and the like, which is relatively advantageous to functional group conversion reactions, and it allows a high degree of freedom in initiator and catalyst designing. In addition to the references cited above referring to this atom transfer radical polymerization, further references may also be cited, for example WO 96/30421. WO 97/18247, WO 98/01480, WO 98/40415, Japanese Kokai Publication Hei-09-208616 and Japanese Kokai Publication Hei-08-41117.

The term "atom transfer radical polymerization" includes within the meaning thereof not only the above-mentioned ordinary atom transfer radical polymerization using an organic halide or sulfonyl halide compound as an initiator but also the so-called "reverse atom transfer radical polymerization" in which a common free radical polymerization initiator such as a peroxide and a high oxidation state complex, for example a copper(II) complex, for ordinary atom transfer radical polymerization are combinedly used.

<Monomers>

The vinyl monomer usable in the practice of the present invention is not particularly restricted but includes various monomers. As examples, there may be mentioned (meth) acrylic monomers such as (meth)acrylic acid, methyl (meth) acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth) acrylate, toluyl (meth)acrylate, benzyl (meth)acrylate, 2-methoxyethyl (meth)acrylate, 3-methoxybutyl (meth) acrylate, 2-hydroxyethyl (meth)acrylate, 2-hydroxypropyl (meth)acrylate, stearyl (meth)acrylate, glycidyl (meth) acrylate, 2-aminoethyl (meth)acrylate, γ-(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid and monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality of them may be copolymerized. Although there is no limitative meaning, styrenic monomers and (meth)acrylic monomers are preferred from the viewpoint of physical properties of products, among others. More preferred are acrylic ester monomers and methacrylic ester monomers. Butyl acrylate is still more preferred. In the practice of the present invention, these preferred monomers may be copolymerized with other monomers and, in such cases, the content of these preferred monomers is preferably not less than 40% by weight.

<Initiator>

In atom transfer radical polymerization, an organic halide (e.g. an ester compound having a halogen at the α position, or a compound having a halogen at the benzyl position) or a sulfonyl halide compound or the like is generally used as the initiator. A group capable of functioning in lieu of the halogen may also be used. Specific examples are:

$C_6H_5$—$CH_2X$,
$C_6H_5$—$C(H)(X)CH_3$,
$C_6H_5$—$C(X)(CH_3)_2$ (in the above chemical formulas, $C_6H_5$ represents a phenyl group and X represents a chlorine, bromine or iodine atom), $R^1$—$C(H)(X)$—$CO_2R^2$,
$R^1$—$C(CH_3)(X)$—$CO_2R^2$,
$R^1$—$C(H)(X)$—$C(O)R^2$,
$R^1$—$C(CH_3)(X)$—$C(O)R^2$ (in the above formulas, $R^1$ and $R^2$ are the same or different and each represents a hydrogen atom, an alkyl group containing 1 to 20 carbon atoms, an aryl group containing 6 to 20 carbon atoms or an aralkyl group containing 7 to 20 carbon atoms and X represents a chlorine, bromine or iodine atom), $R^1$—$C_6H_4$—$SO_2X$ (in the above formula, $R^1$ and $R^2$ are the same or different and each represents a hydrogen atom, an alkyl group containing 1 to 20 carbon atoms, an aryl group containing 6 to 20 carbon atoms or an aralkyl group containing 7 to 20 carbon atoms and X represents a chlorine, bromine or iodine atom), and the like.

An organic halide or sulfonyl halide compound additionally having a functional group other than a functional group serving to initiate the polymerization may also be used as the initiator in living radical polymerization. In such a case, a vinyl polymer having said additional functional group at one main chain terminus and a halogen atom at the other main chain terminus is produced. As such functional group, there may be mentioned an alkenyl group, a crosslinking silyl group, a hydroxyl group, an epoxy group, an amino group, an amido group, and the like.

The alkenyl-containing organic halide is not restricted but includes, for example, compounds having a structure represented by the general formula (1):

$$R^4R^5C(X)-R^6-R^7-C(R^3)=CH_2 \qquad (1)$$

wherein $R^3$ is a hydrogen atom or a methyl group, $R^4$ and $R^5$ each is a hydrogen atom or a monovalent alkyl, aryl or aralkyl containing up to 20 carbon atoms or $R^4$ and $R^5$ are mutually bonded together at the respective other ends, $R^6$ is —C(O)O— (ester group), —C(O)— (keto group) or an o-, m- or p-phenylene group, $R^7$ is a direct bond or a divalent organic group containing 1 to 20 carbon atoms, which may optionally contain one or more ether bonds, and X is a chlorine, bromine or iodine atom.

As specific examples of the substituents $R^4$ and $R^5$, there may be mentioned hydrogen, methyl, ethyl, n-propyl, isopropyl, butyl, pentyl, hexyl and the like. $R^4$ and $R^5$ may be combined at the respective other ends to form a cyclic skeleton.

Specific examples of the alkenyl-containing organic halide represented by the general formula (1) are as follows:

$XCH_2C(O)O(CH_2)_nCH=CH_2$,
$H_3CC(H)(X)C(O)O(CH_2)_nCH=CH_2$,
$(H_3C)_2C(X)C(O)O(CH_2)_nCH=CH_2$,
$CH_3CH_2C(H)(X)C(O)O(CH_2)_nCH=CH_2$,

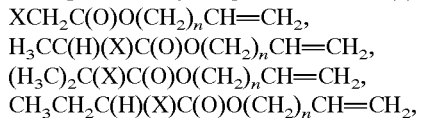

(in the above formulas, X is a chlorine, bromine or iodine atom and n is an integer of 0 to 20);

$XCH_2C(O)O(CH_2)_nO(CH_2)_mCH=CH_2$,
$H_3CC(H)(X)C(O)O(CH_2)_nO(CH_2)_mCH=CH_2$,
$(H_3C)_2C(X)C(O)O(CH_2)_nO(CH_2)_m$, $CH=CH_2$,
$CH_3CH_2C(H)(X)C(O)O(CH_2)_nO(CH_2)_mCH=CH_2$,

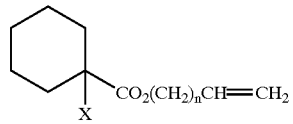

(in the above formulas, X is a chlorine, bromine or iodine atom, n is an integer of 1 to 20 and m is an integer of 0 to 20);

o, m, p-$XCH_2$—$C_6H_4$—$(CH_2)_n$—$CH=CH_2$,
o, m, p-$CH_3C(H)(X)$—$C_6H_4$—$(CH_2)_nCH=CH_2$,
o, m, p-$CH_3CH_2C(H)(X)$—$C_6H_4$—$(CH_2)_n$—$CH=CH_2$, (in the above formulas, X is a chlorine, bromine or iodine atom and n is an integer of 1 to 20);

o, m, p-$XCH_2$—$C_6H_4$—$(CH_2)_n$—$(CH_2)_m$—$CH=CH_2$,
o, m, p-$CH_3C(H)(X)$—$C_6H_4$—$(CH_2)_nO$—$(CH_2)_m$—$CH=CH_2$,
o, m, p-$CH_3CH_2C(H)(X)$—$C_6H_4$—$(CH_2)_n$—O—$(CH_2)_m$—$CH=CH_2$, (in the above formulas, X is a chlorine, bromine or iodine atom, n is an integer of 1 to 20 and m is an integer of 0 to 20);

o, m, p-$XCH_2$—$C_6H_4$—O—$(CH_2)_n$—$CH=CH_2$,
o, m, p-$CH_3C(H)(X)$—$C_6H_4$—O—$(CH_2)_n$—$CH=CH_2$,
o, m, p-$CH_3CH_2C(H)(X)$—$C_6H_4$—O—$(CH_2)$—$CH=CH_2$, (in the above formulas, X is a chlorine, bromine or iodine atom and n is an integer of 0 to 20);

o, m, p-$XCH_2$—$C_6H_4$—O—$(CH_2)_n$—O—$(CH_2)_m$—$CH=CH_2$,
o, m, p-$CH_3C(H)(X)$—$C_6H_4$—O—$(CH_2)_m$—O—$(CH_2)_m$—$CH=CH_2$
o, m, p-$CH_3CH_2C(H)(X)$—$C_6H_4$—O—$(CH_2)_n$—O—$(CH_2)_m$—$CH=CH_2$, (in the above formulas, X is a chlorine, bromine or iodine atom, n is an integer of 1 to 20 and m is an integer of 0 to 20).

As the alkenyl-containing organic halide, there may further be mentioned compounds represented by the general formula (2):

$$H_2C=C(R^3)-R^6-C(R^4)(X)-R^8-R^5 \qquad (2)$$

wherein $R^3$, $R^4$, $R^5$, $R^6$ and X are as defined above and $R^8$ is a direct bond, —C(O)O— (ester group), —C(O)— (keto group) or an o-, m- or p-phenylene group.

$R^6$ is a direct bond or a divalent organic group containing 1 to 20 carbon atoms (which may optionally contain one or more ether bonds) and, when it is a direct bond, the vinyl group is bonded to the carbon atom to which the halogen atom is bonded, hence the compound is an allyl halide. In this case, the carbon-halogen bond is activated by the neighboring vinyl group and therefore it is not always necessary for $R^8$ to be a C(O)O or phenylene group; thus, $R^8$ may be a direct bond. When $R^6$ is not a direct bond, it is desirable that $R^8$ be a C(O)O, C(O) or phenylene group so as to activate the carbon-halogen bond.

Specific examples of the compound of formula (2) are as follows:

$CH_2=CHCH_2X$, $CH_2=C(CH_3)CH_2X$,
$CH_2=CHC(H)(X)CH_3$, $CH_2=C(CH_3)C(H)(X)CH_3$,
$CH_2=CHC(X)(CH_3)_2$, $CH_2=CHC(H)(X)C_2H_5$,
$CH_2=CHC(H)(X)CH(CH_3)_2$,
$CH_2=CHC(H)(X)C_6H_5$, $CH_2=CHC(H)(X)CH_2C_6H_5$,
$CH_2=CHCH_2C(H)(X)$—$CO_2R$,
$CH_2=CH(CH_2)_2C(H)(X)$—$CO_2R$,
$CH_2=CH(CH_2)_3C(H)(X)$—$CO_2R$,
$CH_2=CH(CH_2)_8C(H)(X)$—$CO_2R$,
$CH_2=CHCH_2C(H)(X)$—$C_6H_5$,
$CH_2=CH(CH_2)_2C(H)(X)$—$C_6H_5$,
$CH_2=CH(CH_2)_3C(H)(X)$—$C_6H_5$, (in the above formulas, X is a chlorine, bromine or iodine atom and R is an alkyl, aryl or aralkyl group containing up to 20 carbon atoms); and the like.

Specific examples of the alkenyl-containing sulfonyl halide compound are as follows:

o-, m-, p-$CH_2=CH$—$(CH_2)_n$—$C_6H_4$—$SO_2X$ and
o-, m-, p-$CH_2=CH$—$(CH_2)$—$O$—$C_6H_4$—$SO_2X$ (in the above formulas, X is a chlorine, bromine or iodine atom and n is an integer of 0 to 20).

The crosslinking silyl-containing organic halide is not restricted but includes, for example, compounds having a structure represented by the general formula (3):

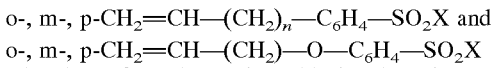
$R^4R^5C(X)$—$R^6$—$R^7$—$C(H)(R^3)CH_2$—$[Si\ (R^9)_{2-b}(Y)_bO]_m$—$Si(R^{10})_{3-a}(Y)_a$   (3)

wherein $R^3$, $R^4$, $R^5$, $R^6$, $R^7$ and X are as defined above, $R^9$ and $R^{10}$ each represents an alkyl, aryl or aralkyl group containing up to 20 carbon atoms or a triorganosiloxy group of the formula $(R')_3SiO$— (in which R' is a monovalent hydrocarbon group containing 1 to 20 carbon atoms and the three R' groups may be the same or different) and, when two or more $R^9$ and/or $R^{10}$ groups are present, they may be the same or different, Y represents a hydroxyl group or a hydrolyzable group and, when two or more Y groups are present, they may be the same or different, a represents 0, 1, 2 or 3, b represents 0, 1 or 2 and m is an integer of 0 to 19, with the condition that the relation $a+bm \geq 1$ should be satisfied.

Specific examples of the compound of general formula (3) are:

$XCH_2C(O)O(CH_2)_nSi(OCH_3)_3$,
$CH_3C(H)(X)C(O)O(CH_2)_nSi(OCH_3)_3$,
$(CH_3)_2C(X)C(O)O(CH_2)_nSi(OCH_3)_3$,
$XCH_2C(O)O(CH_2)_nSi(CH_3)(OCH_3)_2$,
$CH_3C(H)(X)C(O)O(CH_2)_nSi(CH_3)(OCH_3)_2$,
$(CH_3)_2C(X)C(O)O(CH_2)_nSi(CH_3)(OCH_3)_2$, (in the above formulas, x is a chlorine, bromine or iodine atom and n is an integer of 0 to 20);

$XCH_2C(O)O(CH_2)_nO(CH_2)_mSi(OCH_3)_3$,
$H_3CC(H)(X)C(O)O(CH_2)_nO(CH_2)_mSi(OCH_3)_3$,
$(H_3C)_2C(X)C(O)O(CH_2)_nO(CH_{2m}Si(OCH_3)_3$,
$CH_3CH_2C(H)(X)C(O)O(CH_2)_nO(CH_2)_mSi(OCH_3)_3$,
$XCH_2C(O)O(CH_2)_nO(CH_2)_mSi(CH_3)(OCH_3\ )_2$,
$H_3CC(H)(X)C(O)O(CH_2)_nO(CH_2)_mSi(CH_3)(OCH_3)_2$,
$(H_3C)_2C(X)C(O)O(CH_2)_nO(CH_2)_mSi(CH_3)(OCH_3)_2$,
$CH_3CH_2C(H)(X)C(O)O(CH_2)_nO(CH_2)_mSi(CH_3)(OCH_3)_2$, (in the above formulas, x is a chlorine, bromine or iodine atom, n is an integer of 1 to 20 and m is an integer of 0 to 20).

o, m, p-$XCH_2$—$CH_4$—$(CH_2)_2Si(OCH_3)_3$,
o, m, p-$CH_3C(H)(X)$—$C_6H_4$—$(CH_2)_2Si(OCH_3)_3$,
o, m, p-$CH_3CH_2C(H)(X)$—$C_6H_4$—$(CH_2)_2Si(OCH_3)_3$,
o, m, p-$XCH_2$—$C_6H_4$—$(CH_2)_3Si(OCH_3)_3$,
o, m, p-$CH_3C(H)(X)$—$C_6H_4$—$(CH_2)_3Si(OCH_3)_3$,
o, m, p-$CH_3CH_2C(H)(X)$—$C_6H_4$—$(CH_2)_3Si(OCH_3)_3$,
o, m, p-$XCH_2$—$C_6H_4$—$(CH_2)_2O$—$(CH_2)_3Si(OCH_3)_3$,
o, m, p-$CH_3C(H)(X)$—$C_6H_4$—$(CH_2)_2O$—$(CH_2)_3Si(OCH_3)_3$,
o, m, p-$CH_3CH_2C(H)(X)$—$C_6H_4$—$(CH_2)_2O$—$(CH_2)_3Si(OCH_3)_3$,
o, m, p-$XCH_2$—$C_6H_4$—$O$—$(CH_2)_3Si(OCH_3)_3$,
o, m, p-$CH_3C(H)(X)$—$C_6H_4$—$O$—$(CH_2)_3Si(OCH_3)_3$,
o, m, p-$CH_3CH_2C(H)(X)$—$C_6H_4$—$O$—$(CH_2)_3Si(OCH_3)_3$,
o, m, p-$XCH_2$—$C_6H_4$—$O$—$(CH_2)_2O$—$(CH_2)_3Si(OCH_3)_3$,
o, m, p-$CH_3C(H)(X)$—$C_6H_4$—$O$—$(CH_2)_2O$—$(CH_2)_3Si(OCH_3)_3$,
o, m, p-$CH_3CH_2C(H)(X)$—$C_6H_4$—$O$—$(CH_2)_2O$—$(CH_2)_3Si(OCH_3)_3$, (in the above formulas, X is a chlorine, bromine or iodine atom); and the like.

As further examples of the crosslinking silyl-containing organic halide compound, there may be mentioned compounds having a structure represented by the general formula (4):

$(R^{10})_{3-a}(Y)_aSi$—$[OSi(R^9)_{2-b}(Y)_b]_m$—$CH_2C(H)(R^3)$—$R^{11}$—$C(R^4)(X)$—$R^8$—$R^5$   (4)

wherein $R^3$, $R^4$, $R^5$, $R^7$, $R^8$, $R^9$, $R^{10}$, a, b, m, X and Y are as defined above.

Specific examples of such compound are as follows:

$(CH_3O)_3SiCH_2CH_2C(H)(X)C_6H_5$,
$(CH_3O)_2(CH_3)SiCH_2CH_2C(H)(X)C_6H_5$,
$(CH_3O)_3Si(CH_2)_2C(H)(X)$—$CO_2R$,
$(CH_3O)_2(CH_3)Si(CH_2)_2C(H)(X)$—$CO_2R$,
$(CH_3O)_3Si(CH_2)_3C(H)(X)$—$CO_2R$,
$(CH_3O)_2(CH_3)Si(CH_2)_3C(H)(X)$—$CO_2R$,
$(CH_3O)_3Si(CH_2)_4C(H)(X)$—$CO_2R$,
$(CH_3O)_2(CH_3)Si(CH_2)_4C(H)(X)$—$CO_2R$,
$(CH_3O)_3Si(CH_2)_9C(H)(X)$—$CO_2R$,
$(CH_3O)_2(CH_3)Si(CH_2)_9C(H)(X)$—$CO_2R$,
$(CH_3O)_3Si(CH_2)_3C(H)(X)$—$C_6H_5$,
$(CH_3O)_2(CH_3)Si(CH_2)_3C(H)(X)$—$C_6H_5$,
$(CH_3O)_3Si(CH_2)_4C(H)(X)$—$C_6H_5$,
$(CH_3O)_2(CH_3)Si(CH_2)_4C(H)(X)$—$C_6H_5$, (in the above formulas, X is a chlorine, bromine or iodine atom and R is an alkyl, aryl or aralkyl group containing up to 20 carbon atoms); and the like.

The hydroxyl-containing organic halide or sulfonyl halide compound is not particularly restricted but may be a compound as follows:

HO—(CH$_2$)$_n$—OC(O)C(H)(R)(X)

wherein X is a chlorine, bromine or iodine atom, R is a hydrogen atom or an alkyl, aryl or aralkyl group containing up to 20 carbon atoms and n is an integer of 1 to 20.

The amino-containing organic halide or sulfonyl halide compound is not particularly restricted but may be a compound as follows:

H$_2$N—(CH$_2$)$_n$—OC(O)C(H)(R)(X)

wherein X is a chlorine, bromine or iodine atom, R is a hydrogen atom or an alkyl, aryl or aralkyl group containing up to 20 carbon atoms and n is an integer of 1 to 20.

The epoxy-containing organic halide or sulfonyl halide compound is not particularly restricted but may be a compound as follows:

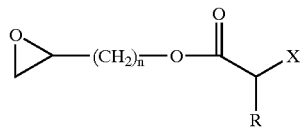

wherein X is a chlorine, bromine or iodine atom, R is a hydrogen atom or an alkyl, aryl or aralkyl group containing up to 20 carbon atoms and n is an integer of 1 to 20.

When the above living radical polymerization is carried out using an organic halide or sulfonyl halide compound having two or more initiation sites as the initiator, a vinyl polymer having a halogen atom at each of both termini is obtained. Specific examples of such initiator are as follow:

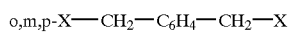
(I-1)

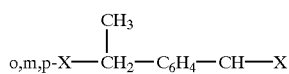
(I-2)

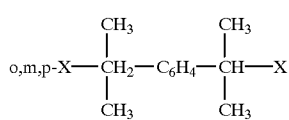
(I-3)

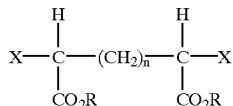
(I-4)

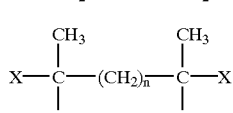
(I-5)

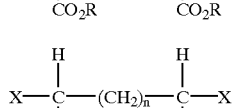
(I-6)

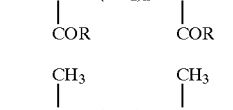
(I-7)

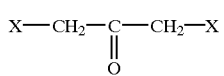
(I-8)

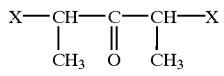
(I-9)

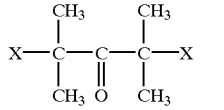
(I-10)

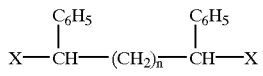
(I-11)

(in the above formula, R represents an alkyl group containing 1 to 20 carbon atoms, an aryl group containing 6 to 20 carbon atoms or an aralkyl group containing 7 to 20 atoms, C$_6$H$_4$ represents a phenylene group, n represents an integer of 0 to 20 and X represents chlorine, bromine or iodine atom.);

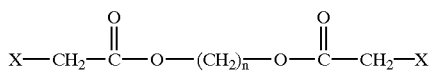
(I-12)

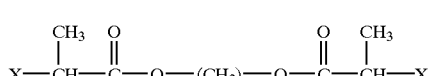
(I-13)

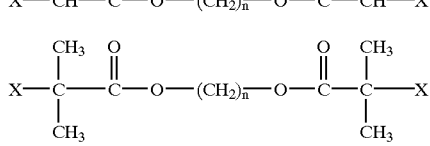
(I-14)

(I-15)

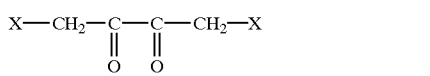
(I-16)

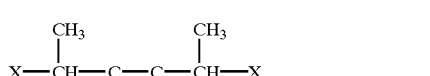
(I-17)

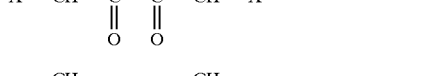
(I-18)

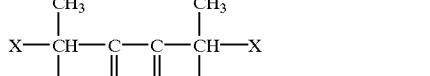
(I-19)

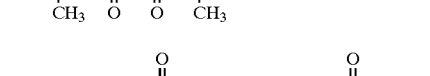
(I-20)

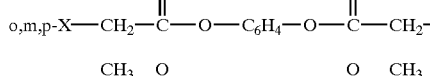
(I-21)

(in the above formulas, R represents an alkyl group containing 1 to 20 carbon atoms, an aryl group containing 6 to 20 carbon atoms or an aralkyl group containing 7 to 20 atoms, $C_6H_4$ represents a phenylene group, n represents an integer of 0 to 20 and X represents chlorine, bromine or iodine atom.)

<Catalyst>

The transition metal complex utilizable as the atom transfer radical polymerization catalyst is not restricted but includes those described in PCT/US 96/17780. Preferred among them are complexes of zero-valence copper, monovalent copper, divalent ruthenium, divalent iron or divalent nickel. Among these, copper complexes are preferred. Specific examples of the monovalent copper compound are cuprous chloride, cuprous bromide, cuprous iodide, cuprous cyanide, cuprous oxide, cuprous perchlorate and the like. The divalent ruthenium chloride-tristriphenylphosphine complex ($RuCl_2(PPh_3)_3$) is also suitable as the catalyst. When a ruthenium compound is used as the catalyst, an aluminum alkoxide is added as an activator. Also suited for use as the catalyst are a divalent iron-bistriphenylphosphine complex ($FeCl_2(PPh_3)_2$), divalent nickel-bistriphenylphosphine complex ($NiCl_2(PPh_3)_2$) and divalent nickel-bistributylphosphine complex ($NiBr_2(PBu_3)_2$).

When a copper compound is used as the catalyst, those ligands described in PCT/US 96/17780 can be used as the ligands thereto. It is not restricted but amine ligands are preferred. Preferred are such ligands as bipyridyl compounds such as 2,2'-bipyridyl and derivatives thereof, 1,10-phenanthroline and derivatives thereof, hexamethyltriethylenetetramine, bispicolylamine, trialkylamines, tetramethylethylenediamine, pentamethyldiethylenetriamine, hexamethyl(2-aminoethyl) amine and the like aliphatic amines. Preferred among them in the practice of the present invention are polyamine compounds, in particular aliphatic polyamines such as pentamethyldiethylenetriamine and hexamethyl(2-aminoethyl) amine. When polyamine compounds, pyridine compounds or aliphatic amine compounds are used as the ligands to a copper compound employed as the catalyst, it is preferred that these ligands have three or more amino groups. The term "amino group" as used herein means a group having a nitrogen atom-carbon atom bond and, among such groups, a group comprising a nitrogen atom bonded only to a carbon atom and/or a hydrogen atom is preferred.

When the polymerization is carried out in a dehydrating system according to the present invention, the present invention produces a marked effect in cases that an amine, in particular an aliphatic amine, is used as the ligand, since the disappearance of the terminal halogen atom is also influenced by the basicity in the polymerization system.

The catalyst may be added to the polymerizer in the form of a complex already having catalyst activity, or a transition metal compound, which is a catalyst precursor, and a ligand may be mixed up in the polymerizer to thereby cause complex formation. In the known processes of atom transfer radical polymerization, this complex formation procedure is generally conducted prior to initiator addition. On the contrary, it is disclosed by the present invention that the polymerization is initiated and/or the catalyst activity is controlled by adding the ligand added to the polymerization system after addition of the initiator, to thereby cause complex formation with the transition metal compound, which is a catalyst precursor, for expression of the catalyst activity.

In cases that the polymerization is carried out in the presence of a nitrile compound in accordance with the present invention, it is preferred, even in the ordinary procedure for initiating atom transfer radical polymerization which comprises adding the initiator after complex formation, to mix the complex precursor transition metal compound with a nitrile compound earlier than ligand addition, since the dispersibility of the complex is increased thereby.

Under the ordinary conditions of atom transfer radical polymerization, the amount of such a ligand as mentioned above is determined by the number of coordination sites on the transition metal and the number of coordinating groups of the ligand and these numbers are made approximately equal to each other. For example, two moles of 2,2'-bipyridyl or aderivative thereof is generally added to each mole of CuBr, and one mole of pentamethyldiethylenetriamine is added to each mole of CuBr. In initiating the polymerization by adding a ligand and/or controlling the catalyst activity by adding a ligand in accordance with the present invention, the ratio therebetween is not restricted, but it is preferred for the metal atom to be in excess relative to the ligand. The ratio between the number of coordination sites and the number of coordinating groups is thus preferably not less than 1.2, more preferably not less than 1.4, still more preferably not less than 1.6 and most preferably not less than 2.

In the practice of the present invention, in the case that a transition metal complex coordinating a nitrile compound from the first as a transition metal compound, namely a catalyst precursor, instead of adding a nitrile compound, the same effects can be obtained. As such complex, which is not particularly restricted, there may be mentioned, for example, a complex obtained by adding a transition metal compound to a nitrile compound in a state of occurrence in excess, allowing the nitrile compound to coordinate on the metal atom and removing the excess nitrile compound. Other examples are $CuBr(NC-R)_n$ and $CuCl(NC-R)_n$ (in the formulas, R is a monovalent organic group such as methyl and n is an integer of not less than 1).

<Solvent, Additive>

The polymerization of the present invention can be carried out in the absence or presence of any of various solvents. As the above solvents, there may be mentioned, for example, hydrocarbon solvents such as benzene and toluene; ether type solvents such as diethyl ether, tetrahydrofuran, diphenyl ether, anisole and dimethoxybenzene; halogenated hydrocarbon solvents such as methylene chloride, chloroform and chlorobenzene; ketone type solvents such as acetone, methyl ethyl ketone and methyl isobutyl ketone; alcohol type solvents such as methanol, ethanol, propanol, isopropanol, n-butyl alcohol and tert-butyl alcohol; nitrile type solvents such as acetonitrile, propionitrile and benzonitrile; ester type solvents such as ethyl acetate and butyl acetate; carbonate type solvents such as ethylene carbonate and propylene carbonate; and the like. These may be used singly or two or more of them may be used in admixture.

Among these solvents, aprotic solvents are preferred. Generally, highly polar solvents are highly capable of absorbing water and shows a tendency to cause a rapid terminal disappearance reaction, hence are more effective in carrying out the polymerization in a dehydrating system according to the present invention. The use of a solvent having a dielectric constant of not less than 10 at 25° C. as a criterion may be mentioned. The nitrile compound the use of which as an additive is taught by the present invention may be used also as a solvent.

It is preferred that these solvents or other additives to be added to the polymerization system be capable of coordinating with the metal compound to be used as a catalyst to form complexes having no catalyst activity but, upon addition of a ligand, allow formation of active catalysts. Even when the solvent has no coordinating ability, the catalyst activity can be controlled by adding a ligand. In some instances, however, such metal compounds as CuBr in a ligand-free state are insufficient in dispersibility and adhere to the vessel wall and, therefore, it is not easy to stably control the catalyst activity. As an example meeting such requirements, there may be mentioned the combination of CuBr as the metal compound and a nitrile compound as the solvent. In PCT/US 96/17780, acetonitrile is mentioned as a preferred ligand in polymerization catalysts but, in actuality, it was confirmed that the acetonitrile complex of CuBr has no polymerization activity. Investigations made by the present inventors, however, revealed that this complex has high crystallizability and, even when it gives a heterogeneous system, it can be satisfactorily dispersed in the polymerization system by adequate stirring. Upon addition of a ligand such as pentamethyldiethylenetriamine, it rapidly forms an active complex catalyzing the polymerization.

<Water Content>

The "substantially dehydrated system" so referred to herein is a system in which the water content on the whole polymerization system basis is preferably not more than 1,000 ppm, more preferably not more than 300 ppm, most preferably not more than 50 ppm.

Since water in the polymerization system attacks the terminal halogen atom in a stoichiometric manner, the viewpoint of this terminal halogen atom/water content ratio is of importance and it is preferred that the water content is not more than the equivalent amount relative to the terminal halogen atoms, more preferably not more than 50%, most preferably not more than 10%.

<Nitrile Compound>

The nitrile compound to be used in the practice of the present invention is not particularly restricted but includes the following compounds, among others: saturated aliphatic nitrites such as acetonitrile, propionitrile, butyronitrile, isobutyronitrile, valeronitrile, isovaleronitrile, 2-methylvaleronitrile, trimethylacetonitrile, hexanenitrile, 4-methylvaleronitrile, heptyl cyanide, octyl cyanide, undecanenitrile, undecyl cyanide, pentadecanenitrile, stearonitrile, malononitrile, succinonitrile, glutaronitrile, 2-methylglutaronitrile, 1,4-dicyanobutane, 1,5-dicyanopentane, 1,6-dicyanohexane, azelanitrile, sebaconitrile and 1,1,3,3-propanetetracarbonitrile, aliphatic cyclic nitriles such as cyclopropyl cyanide, cyclopentanecarbonitrile, cycloheptyl cyanide, 2-norbornanecarbonitrile and 1-adamantanecarbonitrile, hydroxyl-containign nitriles such as glycolonitrile, lactonitrile, 3-hydroxypropionitrile, acetone cyanohydrin and cyclohexanone cyanohydrin, ether group-containing nitriles such as methoxyacetonitrile, methylthioacetonitrile, 3-methoxypropionitrile, 3-ethoxypropionitrile, 3,3-diethoxypropionitrile, 2-cyanoethyl ether, diethoxyacetonitrile, 3,3-dimethoxypropionitrile, 3-cyanopropionaldehyde dimethyl acetal and 3-cyanopropionaldehyde diethyl acetal, cyanamides such as cyanamide, dimethylcyanamide, diethylcyanamide, diisopropylcyanamide, 1-pyrrolidinecarbonitrile, 1-piperidinecarbonitrile, 4-morpholinecarbonitrile and 1,4-piperazinedicarbontirile, amino-containing nitriles such as dimethylaminoacetonitrile, 2-(diethylamino)acetonitrile, iminodiacetonitrile, N-methyl-β-alaninenitrile, 3,3-iminodipropionitrile, 3-(dimethylamino)propionitrile, 1-piperidinepropionitrile, 4,4'-trimethylenebis(1-piperidinepropionitrile), 4-morpholinepropionitrile and 1-pyrrolidinebutyronitrile, nitro-containing nitriles such as tris(2-cyanoethyl)nitromethane, cyanoketones such as pyruvonitrile, 4-methyl-2-oxopentanenitrile, 5-oxohexanenitrile, 2-oxooctanenitrile, acetylmalononitrile and 2-oxo-1-cyclohexanepropionitrile, cyanocarbonates such as methyl cyanoformate, ethyl cyanoformate, 1,1-dicyanoethyl acetate, methyl cyanoacetate, methyl isocyanoacetate, ethyl cyanoacetate, ethyl isocyanoacetate, butyl cyanoacetate and octyl cyanoacetate, and aromatic nitriles such as benzyl cyanide, α-methylbenzyl cyanide, benzonitrile and substituted benzonitriles.

In the practice of the present invention, the addition amount of the nitrile compound to the polymerization system is not particularly restricted but preferably is not more than 50% by volume, generally preferably not more than 30% by volume, more preferably not more than 10% by volume, most preferably not more than 5% by volume, on the whole polymerization system basis.

Since the nitrile compound coordinates on the transition metal atom, the addition amount thereof may be defined in terms of mole ratio relative to the transition metal atom. The addition amount, which is not particularly restricted, is preferably not less than 4 times but not more than 100 times, more preferably not more than 30 times, most preferably not more than 10 times, relative to the transition metal atom. At an amount much smaller than 4 times, satisfactory effects may not be produced in some instances.

<Method of Controlling the Catalyst Activity>

The method of controlling the catalyst activity according to the present invention is not particularly restricted but includes the method comprising supplementally adding the complex itself, which is the catalyst, after initiation of polymerization, and the method comprising allowing a metal compound, which is capable of forming a complex with a ligand and thus serving as a catalyst but, in a ligand-free state, has no or low catalyst activity, to exist in excess relative to the ligand at the early stage and supplementing the ligand later, namely the method of controlling the rate of polymerization by supplementally adding the metal complex-forming ligand after initiation of polymerization to thereby vary the catalyst activity during polymerization. Among them, the latter is preferred, though this is not an exclusive choice.

Since, inmost cases, complexes to serve as catalysts give heterogenous systems and it is sometimes difficult to add them supplementally for controlling purposes, the latter is preferred. the catalyst complex and ligand each may be added as it is or in the form of a solution or dispersion in an appropriate solvent.

The timepoints of adding these compounds are not particularly restricted but they may be added continuously or in divided portions one portion after another.

The amount to be supplementally added is not particularly restricted but, since when the ligand is supplementally added, its addition to an extent above the level of coordinative saturation relative to the catalyst metal atom cannot be expected to bring about a further improvement in catalyst activity, it is preferred, to avoid such situation, that the metal compound remain in excess relative to the final addition amount of the ligand. Although the metal compound may be supplementally added later, it is preferred from the process viewpoint that the whole required amount thereof be added from the first.

It is considered that, under ideal conditions, the rate of polymerization in atom transfer radical polymerization is generally in a linear relation with the catalyst amount, in a linear relation with the amount of the growing terminus, and in a linear relation with the amount of the monomer. Therefore, when the amount of a monomer polymerized per unit time should be controlled at a constant amount, the catalyst amount is not particularly restricted, but for instance, it is appropriate to continuously adjust the amount so that the product of the amount of residual monomer and the amount of active catalyst may remain constant. Further, in a semi-batchwise process in which a monomer is supplementally added, the whole volume increases and the concentrations of the catalyst and growing terminus decrease with the addition of the monomer and, therefore, a conceivable method comprises, for example, determining the final catalyst concentration required to attain a desirable final polymerization rate and calculating the required catalyst amount such that the product of the catalyst concentration and growing terminus concentration on that occasion may be equal to the product of the catalyst concentration and growing terminus concentration at each timepoint during monomer addition.

<Polymerization Conditions>

The polymerization can be carried out in the range of 0 to 200° C., preferably within the range of room temperature to 150° C., though the polymerization temperature is not particularly restricted.

The polymerization atmosphere is not particularly restricted but an oxygen-free atmosphere is preferred. In the presence of oxygen, radicals may undergo influences by oxygen and the catalyst may possibly be oxidized and lose its activity.

The polymerization mixture is preferably stirred well. In particular on the occasions of adding the catalyst metal complex or ligand, thorough stirring is preferred for attaining rapid and uniform dispersion.

As for the mode of polymerization, the present invention can be applied to batchwise polymerization, semi-batchwise polymerization in which the monomer is supplementally added, and continuous polymerization, among others.

<Residual Terminal Halogen Content>

The method of the present invention is effective in giving polymers in which the residual terminal halogen content is high. That the residual terminal halogen content is high generally means that the residual terminal halogen percentage is not less than 20%, preferably not less than 50%, more preferably not less than 80%.

Generally, the residual terminal halogen percentage often becomes a problem when the percentage of polymerization of the monomer is high. If the polymerization percentage is low, the rate of polymerization (amount of monomer polymerized per unit time) is sufficiently high and the competitive reaction, namely terminal group disappearance, is unnoticeable but, as the polymerization percentage increases, the rate of polymerization falls and the terminal group disappearance becomes conspicuous. Terminal group disappearance after arriving at a high polymerization percentage is often overlooked since it does not give a great influence upon the number average molecular weight or molecular weight distribution. The method of the present invention produces its effects to a greater extent at a high polymerization percentage, preferably at a molar monomer conversion of not less than 50%, more preferably not less than 80%, most preferably not less than 90%.

<Molecular Weight Distribution>

In accordance with the present invention, it is possible to obtain polymers narrow in molecular weight distribution, expressed in terms of the ratio of weight average molecular weight to number average molecular weight as determined generally by gel permeation chromatography, although the method of determination thereof is not particularly restricted. The molecular weight distribution is generally less than 1.8, preferably not more than 1.5, more preferably not more than 1.2, most preferably not less than 1.15.

<Scale>

The method of the present invention is applicable not only on the laboratory scale of polymerization but also on a larger scale. With the increase in scale, the necessity of controlling the heat liberation and polymerization time increases, hence the effects of the invention becomes more remarkable. The whole polymerization system preferably has a volume of not less than one liter, more preferably not less than 10 liters, most preferably not less than 1,000 liters.

The four conditions found out by the present invention, namely (1) in a substantially dehydrated system and/or (2) in the presence of a nitrile compound and/or (3) addition, to the system, of a ligand to the polymerization catalyst to thereby initiate the polymerization and/or (4) varying the polymerization catalyst activity during polymerization to thereby control the rate of polymerization, are each singly effective in controlling the atom transfer radical polymerization but are related closely, so that, when they are combinedly employed, enhanced effects can be obtained.

For example, such a series of procedural steps as mentioned below may be mentioned. CuBr is admixed with dried acetonitrile to form a complex and then a dried monomer and initiator are added, followed by heating. Thereto is added dried pentamethyldiethylenetriamine to thereby initiate the polymerization. Then, with the progress of polymerization, dried pentamethyldiethylenetriamine is supplementally added to thereby improve the catalyst activity.

The polymers having a terminal halogen at a high percentage as produced by the method of the present invention can be used either as such or after introduction of various functional groups, for example a hydroxyl, alkenyl or silyl group, by various conversion reactions, for curable compositions and so forth.

EXAMPLES

The following examples illustrate the present invention in further detail. They are, however, by no means limitative of the scope of the invention.

In the following examples, the "number average molecular weight" and "molecular weight distribution (ratio of weight average molecular weight to number average molecular weight)" were calculated by the standard polystyrene equivalent technique using gel permeation chromatography (GPC). The GPC column used was a column packed with a crosslinked polystyrene gel, and chloroform was used as solvent for GPC.

The water content in the system was measured by Karl Fischer titrimetry. The terminal function group content was determined by utilizing $^1$H-NMR.

Example 1

A 100-ml glass reaction vessel was charged with dehydrated reagents; namely butyl acrylate (50.0 mL, 44.7 g, 349 mmol), cuprous bromide (625 mg, 4.36 mmol), pentamethyldiethylenetriamine (0.910 mL, 756 mg, 4.36 mmol) and acetonitrile (5 mL) and, after cooling and deaeration under reduced pressure, the system was purged with nitrogen. After thorough stirring, methyl 2-bromopropionate (0.243 mL, 364 mg, 2.18 mmol) was added, and the resulting mixture was heated at 70° C. with stirring. During 7 hours of continued stirring at 70° C., sampling was made from time to time. Each reaction mixture was treated with activated alumina for removing the catalyst and, then, the solvent and residual monomer were distilled off under reduced pressure. The sample taken at 300 minute showed a polymerization percentage of 67%, a product polymer number average molecular weight of 16600 (on a polystyrene equivalent basis) as determined by GPC analysis, with a molecular weight distribution of 1.10. The residual functional group percent age on the initiator basis was 0.8. The final product showed a polymerization percentage of 84% and had a number average molecular weight of 21,500, a molecular weight distribution of 1.12 and a residual functional group ratio of 0.7.

The water content in this polymerization system was 14% (120 ppm) on the terminus basis.

Example 2

Using dehydrated reagents; namely butyl acrylate (50.0 mL, 44.7 g, 349 mmol), cuprous bromide (625 mg, 4.36 mmol), pentamethyldiethylenetriamine (0.910 mL, 756 mg, 4.36 mmol), acetonitrile (5 mL) and diethyl 2,5-dibromoadipate (785 mg, 2.18 mmol), polymerization was carried out in the same manner as in Example 1 at 70° C. for 8 hours, whereby a polymer having bromine atoms at both ends was produced. The final product showed a polymerization percentage of 90% and had a number average molecular weight of 23,600, a molecular weight distribution of 1.14 and a residual functional group ratio of 1.46.

Example 3

Using dehydrated reagents; namely butyl acrylate (300.0 mL, 268 g, 2,090 mmol), cuprous bromide (3.00 g, 20.9 mmol), pentamethyldiethylenetriamine (4.37 mL, 3.63 g, 20.9 mmol), acetonitrile (30 mL) and diethyl 2,5-dibromoadipate (18.8 g, 52.3 mmol), polymerization was carried out in the same manner as in Example 1 at 70° C. for 450 minutes, whereby a polymer having bromine atoms at both ends was produced. At minute 340, the polymerization percentage was 84%, the number average molecular weight was 4,700, the molecular weight distribution was 1.40 and the residual functional group ratio was 1.90. The final product showed a polymerization percentage of 99% and had a number average molecular weight of 5,400, a molecular weight distribution of 1.37 and a residual functional group ratio of 1.73.

Comparative Example 1

Using undehydrated reagents, namely butyl acrylate (10.0 mL, 8.94 g, 69.8 mmol), cuprous bromide (250 mg, 1.74 mmol), pentamethyldiethylenetriamine (0.364 mL, 302 mg, 1.74 mmol), toluene (1 mL) and methyl 2-bromopropionate (0.049 mL, 72.8 mg, 0.44 mmol), polymerization was carried out in the same manner as in Example 1 at 70° C. for 8 hours. At minute 120, the polymerization percentage was 93%, the number average molecular weight was 22,500, the molecular weight distribution was 1.26 and the residual functional group ratio was 0.14. The final product showed a polymerization percentage of 96% and had a number average molecular weight of 24,200, a molecular weight distribution of 1.28 and a residual functional group ratio of 0.

Reference Example 1

Terminal Group Disappearance Model Experiment

Ethyl 2-bromobutanoate (1.29 ml, 1.70 g, 8.72 mmol), cuprous bromide (1.25 g, 8.72 mmol), pentamethyldiethylenetriamine (1.82 mL, 1.51 g, 8.72 mmol) and acetonitrile (5 mL) were heated at 70° C. with stirring and the residual amount of ethyl 2-bromobutanoate was determined by gas chromatography. The result is shown together with the result of Reference Example 2.

Reference Example 2

The procedure of Reference Example 1 was followed under the same conditions with distilled water (0.157 mL, 0.157 g, 8.72 mmol) added to the system. After about 10 hours, the residual percentage of ethyl 2-bromobutanoate was 56% in Reference Example 1 where water was not added, while, in Reference Example 2 where water was added, the percentage was 38%.

Example 4

A flask equipped with a stirrer was charged with CuBr (625 mg, 4.36 mmol), acetonitrile (5 mL), butyl acrylate (50 mL, 44.70 g, 348.8 mmol) and pentamethyldiethylenetriamine (0.910 mL, 756 mg, 4.36 mmol), then cooled, deaerated under reduced pressure and purged with nitrogen. This mixture was heated at 70° C. on an oil bath with stirring. No portion of the catalyst adhered to the vessel wall at all, and the catalyst was uniformly diffused throughout the reaction system by stirring. The polymerization initiator methyl 2-bromopropionate (0.973 mL, 1.456 g, 8.72 mmol) was added to this mixture. Immediate initiation of polymerization was confirmed by the rising temperature of the polymerization system. The temperature rose to 86° C. in 40 minutes, then gradually fell and became equal to the bath temperature. The polymerization percentage was 38% after 30 minutes, and 84% after 60 minutes. Gel permeation chromatography carried out at minute 30 showed a polystyrene-based number average molecular weight Mn of 2,400 and a weight average molecular weight/number average molecular weight ratio Mw/Mn of 1.18 and, at minute 60, the Mn was 5,100 and the ratio Mw/Mn was 1.11. This reaction mixture showed no catalyst adhesion to the vessel wall and uniform diffusion was maintained by stirring until minute 240 when the polymerization percentage amounted to 99%.

Example 5

A flask equipped with a stirrer was charged with CuBr (250 mg, 1.74 mmol), acetonitrile (5 mL), butyl acrylate (50 mL, 44.70 g, 348.8 mmol) and pentamethyldiethylenetriamine (0.364 mL, 302 mg, 1.74 mmol), then cooled, deaerated under reduced pressure and purged with nitrogen. This mixture was heated at 70° C. on an oil bath with stirring. No portion of the catalyst adhered to the vessel wall at all, and the catalyst was uniformly diffused throughout the reaction system by stirring. The polymerization initiator methyl 2-bromopropionate (0.973 mL, 1.456 g, 8.72 mmol) was added to this mixture. Immediate initiation of polymerization was confirmed by the rising temperature of the polymerization system. The temperature rose to 77° C. in 50 minutes, then gradually fell and became equal to the bath temperature. The polymerization percentage was 23% after 30 minutes, 46% after 60 minutes and 84% after 120 minutes. Gel permeation chromatography carried out at minute 60 showed a polystyrene-based number average molecular weight Mn of 2,700 and a weight average molecular weight/number average molecular weight ratio Mw/Mn of 1.15 and, at minute 120, the Mn was 4,600 and the ratio Mw/Mn was 1.11. This reaction mixture showed no catalyst adhesion to the vessel wall and uniform diffusion was maintained by stirring until minute 240 when the polymerization percentage amounted to 95%.

When the results of both of Example 4 and Example 5 are taken into consideration, it is evident that, as a result of addition of anitrile compound (acetonitrile in these examples), the polymerization catalyst is diffused uniformly in the system throughout the period of polymerization and that, as an effect thereof, the rate of polymerization can be controlled by means of the catalyst amount.

Comparative Example 2

A flask equipped with a stirrer was charged with CuBr (625 mg, 4.36 mmol), toluene (5 mL), butyl acrylate (50 mL, 44.70 g, 348.8 mmol) and pentamethyldiethylenetriamine (0.910 mL, 756 mg, 4.36 mmol), then cooled, deaerated under reduced pressure and purged with nitrogen. This mixture was heated at 70° C. on an oil bath with stirring. At this point of time, a portion of the catalyst had already adhered to the vessel wall. The polymerization initiator methyl 2-bromopropionate (0.973 mL, 1.456 g, 8.72 mmol) was added to this mixture. Immediate initiation of polymerization was confirmed by the rising temperature of the polymerization system. The temperature rose to 104° C. in 25 minutes, then gradually fell and became equal to the bath temperature. The polymerization percentage was 43% after 15 minutes 90% after 30 minutes. Gel permeation chromatography carried out at minute 15 showed a polystyrene-based number average molecular weight Mn of 1,700 and a weight average molecular weight/number average molecular weight ratio Mw/Mn of 1.34 and, at minute 30, the Mn was 5,100 and the ratio Mw/Mn was 1.16. This reaction mixture, the heating of which was discontinued at minute 60 when the polymerization percentage reached 96%, showed increased catalyst adhesion to the vessel wall with the progress of polymerization.

Comparative Example 3

A flask equipped with a stirrer was charged with CuBr (250 mg, 1.74 mmol), toluene (5 mL), butyl acrylate (50 mL, 44.70 g, 348.8 mmol) and pentamethyldiethylenetriamine (0.364 mL, 302 mg, 1.74 mmol), then cooled, deaerated under reduced pressure and purged with nitrogen. This mixture was heated at 70° C. on an oil bath with stirring. No portion of the catalyst adhered to the vessel wall at all, and the catalyst was uniformly diffused throughout the reaction system. The polymerization initiator methyl 2-bromopropionate (0.973 mL, 1.456 g, 8.72 mmol) was added to this mixture. No heat liberation was observed and the polymerization scarcely proceeded even after 240 minutes.

When the results of Comparative Examples 2 and 3 are globally compared with the results of Examples 4 and 5, it is evident that, under nitrile compound-free conditions, catalyst diffusion is insufficient, catalyst adhesion to the vessel wall is observed, and the reaction rate can hardly be controlled in response to changes in the amount of the catalyst.

Example 6

A flask equipped with a stirrer was charged with CuBr (1.251 g, 8.72 mmol), acetonitrile (5 mL) and butyl acrylate (50 mL, 44.70 g, 348.8 mmol), then cooled, deaerated under reduced pressure and purged with nitrogen. This mixture was heated at 70° C. on an oil bath with stirring. CuBr turned into white crystals and no portion of the catalyst adhered to the vessel wall, and the catalyst was uniformly diffused throughout the reaction system by stirring. The polymerization initiator methyl 2-bromopropionate (0.973 mL, 1.456 g, 8.72 mmol) was added to this mixture. The resulting mixture was stirred for 360 minutes with heating but the polymerization did not proceed at all.

Upon addition of pentamethyldiethylenetriamine (1.821 mL, 1.511 g, 8.72 mmol) to this mixture, a green complex appeared in the whole reaction system and this was uniformly diffused by stirring. It was confirmed that, upon addition of the amine, the polymerization started with heat liberation. The polymerization percentage was 85% after 15 minutes and 96% after 30 minutes. This reaction mixture showed no catalyst adhesion to the vessel wall and uniform diffusion was maintained by stirring to the end.

From the above result, it was confirmed that the nitrile compound-coordinated complex, without the amine ligand, has little catalyst activity. Thus, it was confirmed that when the transition metal atom is in excess relative to the amine ligand or the like catalyst ligand, that portion of the transition metal atom which is thought to have no catalyst ligand coordinating thereon has no catalyst activity.

Example 7

A 100-mL round bottom flask equipped with a stirrer was charged with CuBr (250 mg, 1.74 mmol) and acetonitrile (5 mL) and the mixture was stirred thoroughly. To this was added butyl acrylate (15.0 mL, 13.4 g, 0.105 mol), the resulting mixture was then frozen, deaerated under reduced pressure and the flask was purged with nitrogen. The mixture was stirred at 70° C. on an oil bath for 30 minutes. The pale green precipitate of CuBr disappeared and a uniform dispersion of white crystals was formed. Pentamethyldiethylenetriamine (0.0583 mL, 48.4 mg, 0.28 mmol) (hereinafter referred to as "triamine") was added thereto with thorough stirring. The mixture assumed a pale green color. To this was added, at 70° C., a solution of the difunctional initiator diethyl 2,5-dibromoadipate (1.570 g, 4.36 mmol) in butyl acrylate (5.0 mL, 4.47 g, 34.9 mmol). The polymerization reaction began with slight heat liberation. After the lapse of 30 minutes, continuous dropwise addition of butyl acrylate (30.0 mL, 26.8 g, 0.209 mol) was started at a rate of about 6.3 mL/hour. Sampling was made at intervals for checking the residual amount of the monomer by gas chromatography. After the lapse of 2 hours, the triamine (0.10 mL, 83 mg, 0.48 mmol) was added, whereupon very slight heat liberation was observed, indicating a recovery of the rate of polymerization. Thereafter, at 4 hours and 30 minutes, the triamine (0.06 mL, 50 mg, 0.29 mmol) was added and, at 5 hours and 10 minutes, the triamine (0.10 mL, 83 mg, 0.48 mmol) was added. After 7 hours, the polymerization procedure was terminated. The amounts of the monomer added, remaining and consumed, respectively, are shown graphically in FIG. 1 each as a function of time. It is evident that the course of consumption of butyl acrylate was commensurate with the amount added so that the residual amount thereof was well controlled. The number average molecular weight, on the polystyrene basis, of the product as determined by gel permeation chromatography increased in proportion to the monomer consumption, as scheduled. The polymerization percentage at the time of termination of the polymerization was 93%, the number average molecular weight Mn of the product was 11,700, the molecular weight distribution, namely the weight average molecular weight/number average molecular weight ratio Mw/Mn, was 1.18, and the residual bromine atom content at both termini was 1.8 atoms per molecule. The maximum internal temperature throughout the polymerization process was the bath temperature plus 4° C. From this and the above results, it is evident that the rate of polymerization was very satisfactorily controlled.

Example 8

Figure 2:
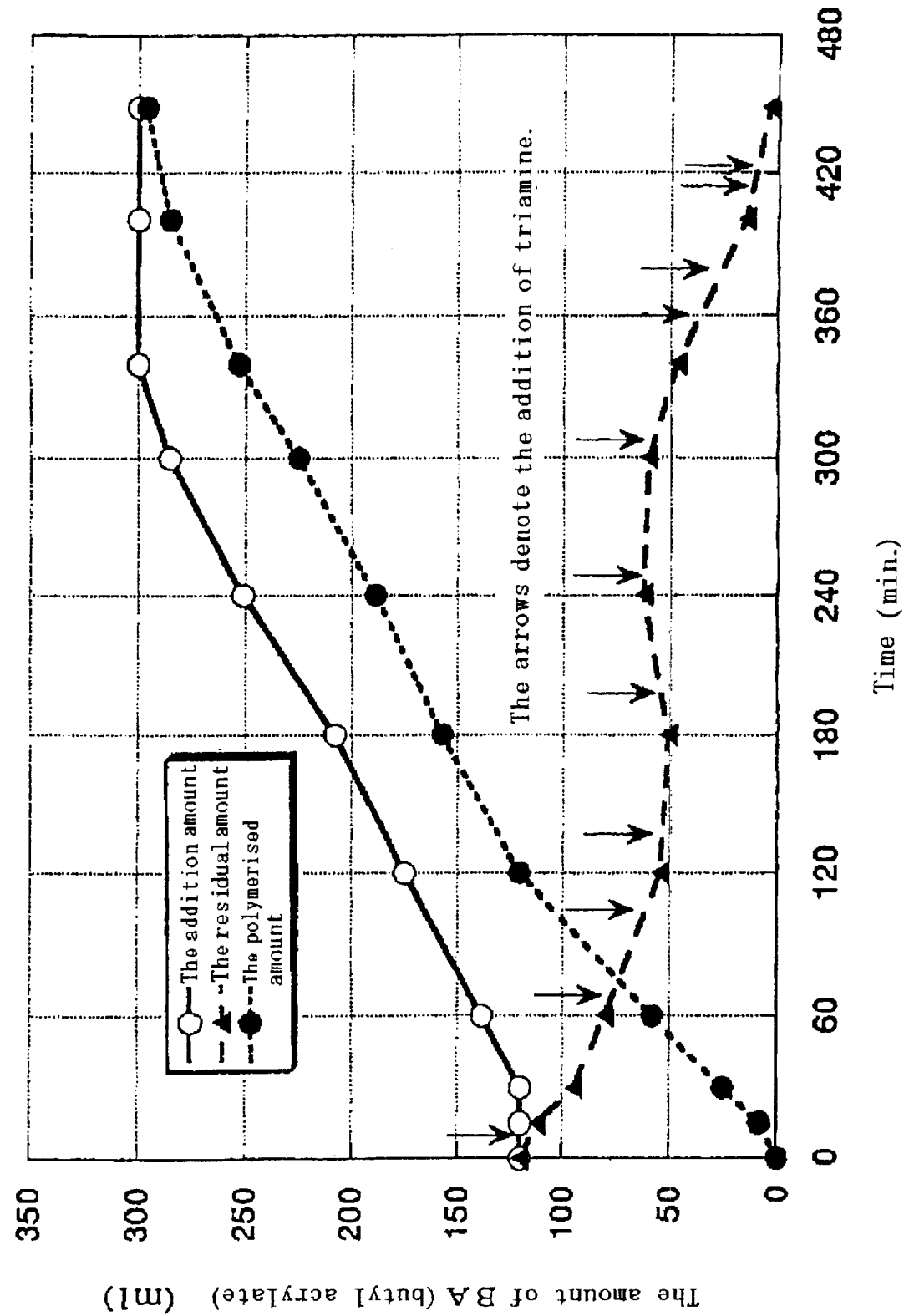
FIG. 2 is a graphic representation of the monomer addition amount, residual percentage and consumption versus time in Example 8.

A 500-mL round bottom flask equipped with a stirrer was charged with CuBr (3.00 g, 20.9 mmol) and acetonitrile (30 mL) and the mixture was stirred thoroughly. To this was added butyl acrylate (100.0 mL, 89.4 g, 0.680 mol), the resulting mixture was then frozen and deaerated under reduced pressure and the flask was purged with nitrogen. The mixture was stirred at 70° C. on an oil bath for 30 minutes. The pale green precipitate of CuBr disappeared and a uniform dispersion of white crystals was formed. To this was added a solution of the difunctional initiator diethyl 2,5-dibromoadipate (18.83 g, 52.3 mmol) in butyl acrylate (20.0 mL, 17.9 g, 140 mmol). At this point of time, the polymerization did not proceed at all even in the presence of the initiator. To this was added, at 70° C., pentamethyldiethylenetriamine (0.175 mL, 145 mg, 0.84 mmol) (hereinafter referred to as "triamine") with thorough stirring. The color of the mixture turned pale green and, immediately, the polymerization started with very slight heat liberation. After 30 minutes and thereon, butyl acrylate (180.0 mL, 161 g, 1.26 mol) was added dropwise continuously at a rate of about 38 mL/hour. Sampling was made at intervals for checking the residual monomer amount by gas chromatography and 0.02 mL (17 mg, 0.10 mmol) to 0.04 mL (33 mg, 0.19 mmol) of the triamine was added at 30-minute to 1-hour intervals. Upon each addition of the triamine, slight heat liberation was observed and, thus, a recovery in rate of polymerization was confirmed. After 7 hours and 30 minutes, the polymerization procedure was completed. The amounts of the monomer added, remaining and consumed, respectively, are shown graphically in FIG. 2 each as a function of time. It is evident that the course of consumption of butyl acrylate was commensurate with the amount added so that the residual amount thereof was well controlled. The number average molecular weight, on the polystyrene basis, of the product as determined by gel permeation chromatography increased in proportion to the monomer consumption, as scheduled. The polymerization percentage at the time of termination of the polymerization was 99%, the number average molecular weight Mn of the product was 5,400, the molecular weight distribution, namely the weight average molecular weight/number average molecular weight ratio Mw/Mn, was 1.37, and the residual bromine atom content at both termini was 1.7 atoms per molecule. In spite of scale enlargement as compared with Example 7, the inside temperature was maintained at levels not higher than the bath temperature plus 8° C. throughout the polymerization process. From this and the above results, it is evident that the rate of polymerization was very satisfactorily controlled.

Example 9

A flask equipped with a stirrer was charged with CuBr (1.251 g, 8.72 mmol), acetonitrile (5 mL) and butyl acrylate (50 mL, 44.70 g, 348.8 mmol) and the mixture was cooled and deaerated under reduced pressure and the flask was purged with nitrogen. The mixture was stirred at 70° C. on an oil bath. The CuBr turned into white crystals, no portion of the catalyst adhered to the vessel wall and the catalyst was uniformly diffused in the whole reaction system by stirring. To this was added the polymerization initiator methyl 2-bromopropionate (0.973 mL, 1.456 g, 8.72 mmol). After 360 minutes of stirring with heating, no progress of polymerization was observed.

To this was added pentamethyldiethylenetriamine (1.821 mL, 1.511 g, 8.72 mmol). The green color of the complex formed immediately appeared through the reaction system and the complex was uniformly diffused upon stirring. It was confirmed that the polymerization had started with heat liberation simultaneously with the addition. The polymerization percentage after 15 minutes was 85% and that after 30 minutes was 96%.

With this reaction mixture, no catalyst adhesion to the vessel wall was observed to the last and uniform diffusion of the catalyst was maintained by stirring.

From the above result, it was confirmed that the nitrile compound-coordinated complex, without the amine ligand, has little catalyst activity. Thus, it was confirmed that when the transition metal atom is in excess relative to the amine ligand or the like catalyst ligand, that portion of the transition metal atom which is thought to have no catalyst ligand coordinating thereon has no catalyst activity.

Comparative Example 4

Figure 3:
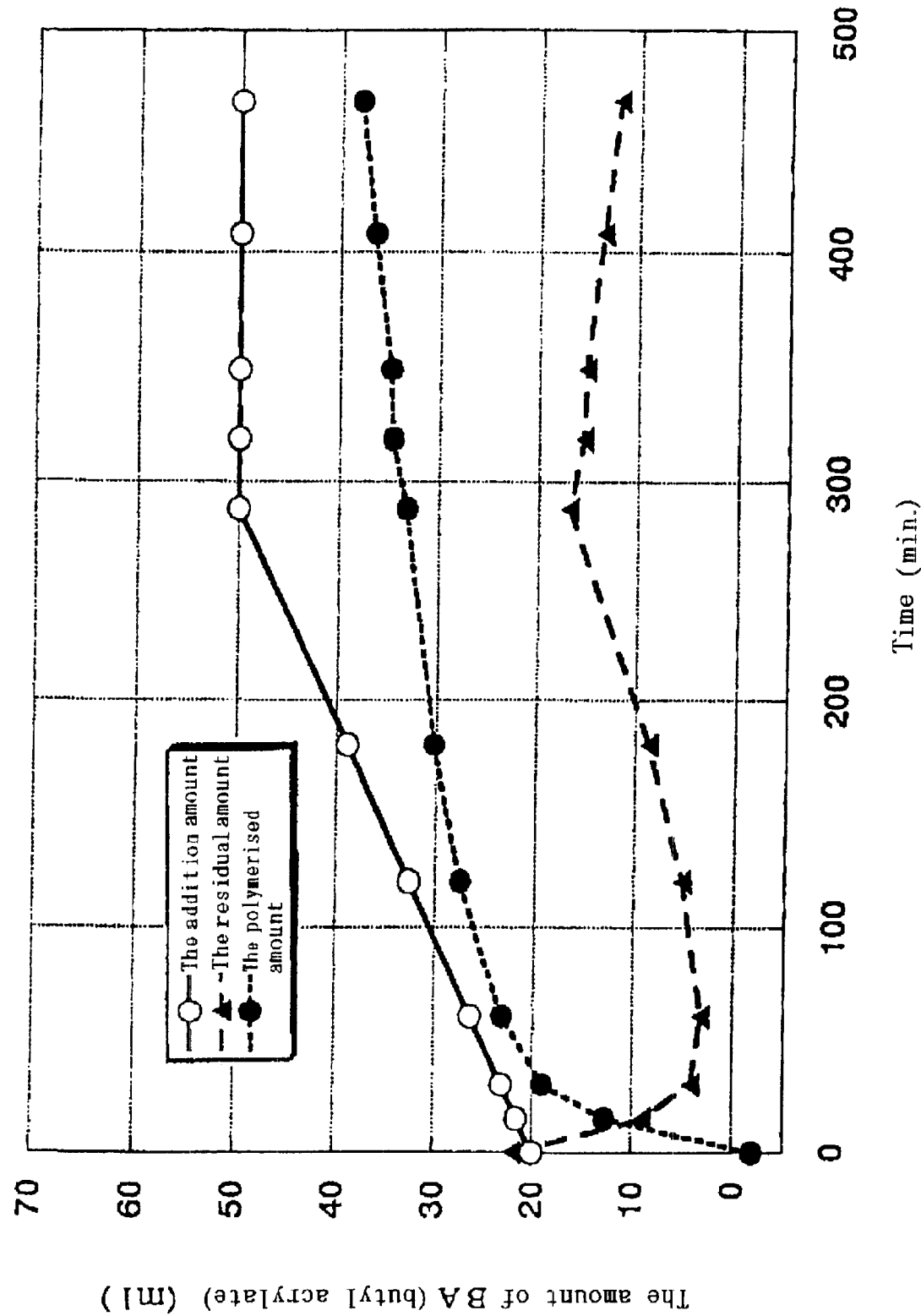
FIG. 3 is a graphic representation of the monomer addition amount, residual percentage and consumption versus time in Comparative Example 4.

A 100-mL round bottom flask equipped with a stirrer was charged with CuBr (625 mg, 4.36 mmol), acetonitrile (5 mL) and pentamethyldiethylenetriamine (0.910 mL, 756 mg, 4.36 mmol), butyl acrylate (20.0 mL, 17.9 mg, 140 mmol) was added, the mixture was frozen and deaerated under reduced pressure and the flask was purged with nitrogen. The mixture was stirred at 70 on an oil bath for 30 minutes. After slight cooling, the monovalent initiator methyl 2-bromopropionate (0.973 mL, 1.46 g, 8.72 mmol) was added and, while the mixture was heated on an oil bath at 70° C., continuous dropwise addition of butyl acrylate (30.0 mL, 26.8 g, 209 mmol) was started at a rate of 6.3 mL/minute. Heat liberation immediately occurred and the inside temperature rose to 87° C. The polymerization started with slight heat liberation. After the lapse of 30 minutes, continuous dropwise addition of butyl acrylate (30.0 mL, 26.8 g, 0.209 mol) was started at a rate of about 6.3 mL/hour. Sampling was made at intervals for checking the residual monomer amount by gas chromatography. The amounts of the monomer added, remaining and consumed, respectively, are shown graphically in FIG. 3 each as a function of time. It can be confirmed that the consumption of butyl acrylate was very high at the early stage due to the rise in temperature as well and thereafter the residual monomer amount tended to increase. Even at 8 hours when the polymerization procedure was terminated, the polymerization percentage of butyl acrylate was 76%. This result indicates that the conventional technique has a problem in controlling the rate of polymerization.

Example 10

Polymerization Using TREN Ligand

In a nitrogen atmosphere, a 30-mL glass reaction vessel was charged with cuprous bromide (12.5 mg, 0.0871 mmol) and acetonitrile (1.0 mL) and the mixture was heated at 70° C. with stirring for complex formation. To this was added a solution of diethyl 2,5-dibromoadipate (0.314 g, 0.872 mmol) in butyl acrylate (10.0 mL, 69.8 mmol). With stirring at 70° C., tris(diethylaminoethyl)amine (16 µL, 0.0699 mmol) was added portionwise. After 310 minutes, heating was discontinued. At this point of time, the rate of consumption of butyl acrylate as determined by GC was 93.6%. The mixture was diluted with toluene and treated with activated alumina, and the volatile matter was distilled off by heating under reduced pressure to give a colorless transparent polymer. GPC measurement (on a polystyrene equivalent basis) of the polymer obtained revealed a number average molecular weight of 12,100, a weight average molecular weight of 13,400, a molecular weight distribution of 1.10 and a bromine atom introduction rate of 1.99 on the number average molecular weight basis.

Example 11

Semi-batchwise Polymerization of 4 ka of BA

In a nitrogen atmosphere, a 10-liter glass reaction vessel was charged with cuprous bromide (35.3 g, 0.246 mol) and acetonitrile (470 mL), and the mixture was heated at 70° C. for 60 minutes. To this was added butyl acrylate (940 mL, 6.56 mol), and the resultant mixture was further stirred for 60 minutes. To this was added pentamethyldiethylenetriamine (2.00 mL, 9.58 mmol), whereupon mild heat liberation by the reaction mixture was observed and the polymerization started. After 55 minutes and thereon, butyl acrylate (3.76 L, 26.2 mol) was added over 260 minutes, during which time pentamethyldiethylenetriamine (5.00 mL, 24.0 mmol) was added portionwise while sampling the reaction mixture to monitor the reaction. Upon each addition of pentamethyldiethylenetriamine, rapid but mild heat liberation was observed and an improvement in catalyst activity was thus confirmed. After completion of the addition of butyl acrylate, heating was further continued for 90 minutes. The consumption of butyl acrylate then determined by GC measurements was 97.1%. The mixture was diluted with toluene and treated with activated alumina, and the volatile matter was distilled off by heating under reduced pressure to give a colorless transparent polymer. GPC measurements (on a polystyrene equivalent basis) of the polymer obtained revealed a number average molecular weight of 10,800, a weight average molecular weight of 12,400, a molecular weight distribution of 1.15 and a bromine atom introduction rate of 1.8 on the number average molecular weight basis.

Example 12

Semi-batchwise Polymerization of 5 kg of Alkenyl-terminated BA

In a nitrogen atmosphere, a 10-liter glass reaction vessel was charged with cuprous bromide (41.9 g, 0.293 mol) and acetonitrile (559 mL), and the mixture was heated at 70° C. for 45 minutes. To this was added butyl acrylate (1.12 L, 7.80 mol), and the resultant mixture was further heated for 40 minutes. To this was added pentamethyldiethylenetriamine (4.00 mL, 19.2 mmol), whereupon the heat liberation from the reaction mixture was observed. Heating at 70° C. was continued with stirring and, after 60 minutes and thereon, butyl acrylate (4.47 L, 31.2 mol) was added over 190 minutes, during which time pentamethyldiethylenetriamine (4.00 mL, 19.2 mmol) was added portionwise while sampling the reaction mixture to monitor the reaction. Upon each addition of pentamethyldiethylenetriamine, rapid but mild heat liberation was observed and an improvement in catalyst activity was thus confirmed. After completion of the addition of butyl acrylate, heating was further continued for 60 minutes. The consumption of butyl acrylate then determined by GC measurement was 93.2%. 1,7-Octadiene (1.44 L, 9.75 mol) and pentamethyldiethylenetriamine (20.5 mL, 98.2 mmol) were added and heating was continued for 210 minutes. The mixture was diluted with toluene and treated with activated alumina, and the volatile matter was distilled off by heating under reduced pressure to give a pale yellow polymer. GPC measurement (on a polystyrene equivalent basis) of the polymer obtained revealed a number average molecular weight of 14,000, a weight average molecular weight of 18,800, a molecular weight distribution of 1.34 and an alkenyl group introduction rate of 2.49 on a number average molecular weight basis.

Example 13

In a nitrogen atmosphere, a 100-mL glass reaction vessel was charged with cuprous bromide (0.375 g, 2.62 mol) and acetonitrile (1.67 mL), and the mixture was heated at 70° C. with stirring for 25 minutes. To this was added a solution of diethyl 2,5-dibromoadipate (1.57 g, 4.36 mmol) in butyl acrylate (50.0 mL, 0.349 mol). The mixture was stirred at 70° C. for 60 minutes. To this was added pentamethyldiethylenetriamine (90.0 µL, 0.437 mmol), whereupon the polymerization started promptly. The final percentage of polymerization of butyl acrylate was 98%.

INDUSTRIAL APPLICABILITY

According to the present invention, vinyl polymers retaining a terminal halogen atom at a high percentage can be obtained by atom transfer radical polymerization. Even when a heterogeneous polymerization catalyst is used, no portion thereof adheres to the vessel wall and it can be uniformly diffused by stirring. Therefore, reaction control is facilitated in a large-scale production run. Furthermore, owing to this effect, it becomes easy to control the rate of polymerization by modulating the addition amount of the catalyst. And, in atom transfer radical polymerization, the rate of polymerization can be adjusted arbitrarily during the polymerization reaction and the amount of heat liberation can also be controlled. By this, a method is provided for suppressing the initial heat liberation and enabling curtailment of the polymerization time in living polymerization in which the balance between initial intense heat liberation and polymerization time generally causes a problem. This effect becomes more remarkable as the scale is enlarged. The present invention is thus very important in utilizing the technique of atom transfer radical polymerization on a commercial scale.

What is claimed is:

1. A method for controlling an atom transfer radical polymerization
    wherein an atom transfer radical polymerization of a vinyl monomer is carried out under at least one condition selected from the group consisting of the following (1), (2), (3) and (4):
    (1) in a substantially anhydrous system;
    (2) in the presence of a nitrile compound, in which the addition amount of the nitrile compound is 4 to 100 moles/per mole of a transition metal atom;
    (3) addition, to the system, of a ligand to a polymerization catalyst to thereby initiate the polymerization;
    (4) varying a polymerization catalyst activity during polymerization to thereby control the rate of polymerization;
    and the nitrile compound being selected from the group consisting of saturated aliphatic nitriles, aliphatic cyclic nitriles, hydroxyl-containing nitriles, ether group-containing nitriles, cyanamides, amino-containing nitriles, nitro-containing nitriles, cyanoketones, cyanocarbonates and aromatic nitriles.

2. The method for controlling an atom transfer radical polymerization according to claim 1, wherein the polymerization catalyst is a transition metal complex the central metal atom of which is an element of the group 7, 8, 9, 10 or 11 of the Periodic Table.

3. The method for controlling an atom transfer radical polymerization according to claim 2, wherein the transition metal complex is a complex of copper, nickel, ruthenium or iron.

4. The method for controlling an atom transfer radical polymerization according to claim 3, wherein the transition metal complex is a complex of copper.

5. The method for controlling an atom transfer radical polymerization according to claim 4, wherein the complex of copper is prepared from CuCl or CuBr.

6. The method for controlling an atom transfer radical polymerization according to claim 1, wherein a vinyl monomer is a (meth)acrylic monomer.

7. The method for controlling an atom transfer radical polymerization according to claim 6, wherein the (meth)acrylic monomer is an acrylate ester monomer.

8. The method for controlling an atom transfer radical polymerization according to claim 1, wherein a vinyl monomer is a styrenic monomer.

9. The method for controlling an atom transfer radical polymerization according to claim 1, wherein the polymer produced has a molecular weight distribution of less than 1.8.

10. The method for controlling an atom transfer radical polymerization according to claim 1, wherein the water content in the whole polymerization system is not more than 1,000 ppm.

11. The method for controlling an atom transfer radical polymerization according to claim 10, wherein the water content in the whole polymerization system is not more than 300 ppm.

12. The method for controlling an atom transfer radical polymerization according to claim 11, wherein the water content in the whole polymerization system is not more than 50 ppm.

13. The method for controlling an atom transfer radical polymerization according to claim 1, wherein the water content in the whole polymerization system is not more than equivalent, in number of moles, to the amount of the halogen atoms at the growing termini during polymerization.

14. The method for controlling an atom transfer radical polymerization according to claim 1, wherein the nitrile compound is acetonitrile.

15. The method for controlling an atom transfer radical polymerization according to claim 1, wherein a complex having a nitrile ligand is used as a polymerization catalyst precursor transition metal compound instead of using the nitrile compound.

16. The method for controlling an atom transfer radical polymerization according to claim 15, wherein the polymerization catalyst precursor transition metal compound is $CuX(CH_3CN)_n$, X representing a chlorine or bromine atom and n representing an integer of not less than 1.

17. The method for controlling an atom transfer radical polymerization according to claim 1, wherein a ligand of the polymerization catalyst, which is added to the system for initiating the polymerization, is a polyamine compound.

18. The method for controlling an atom transfer radical polymerization according to claim 17, wherein the polyamine compound has three or more amino groups.

19. The method for controlling an atom transfer radical polymerization according to claim 18, wherein the polyamine compound having amino groups comprises at least one selected from the group consisting of pentamethyldiethylenetriamine, hexamethyl (2-aminoethyl) amine, hexamethyltriethylenetetramine and bispicolylamine.

20. The method for controlling an atom transfer radical polymerization according to claim 1, wherein the ligand is a bipyridyl compound.

21. The method for controlling an atom transfer radical polymerization according to claim 1, wherein the ligand is an aliphatic amine compound.

22. The method for controlling an atom transfer radical polymerization according to claim 1, wherein a polymerization catalyst metal complex is supplementary added after addition of an initiator to thereby vary the catalyst activity during polymerization and thus control the rate of polymerization.

23. The method for controlling an atom transfer radical polymerization according to claim 1, wherein a ligand of a polymerization catalyst metal complex is supplementary added after addition of an initiator to thereby vary the catalyst activity during polymerization and thus control the rate of polymerization.

24. The method for controlling an atom transfer radical polymerization according to claim 1, wherein the polymerization is carried out batchwise.

25. The method for controlling an atom transfer radical polymerization according to claim 1, wherein the polymerization is carried out semi-batchwise.

* * * * *